Dec. 17, 1935.  C. D. RUCKMAN  2,024,780
FLUID PRESSURE CONTROLLING DEVICE
Filed April 23, 1934
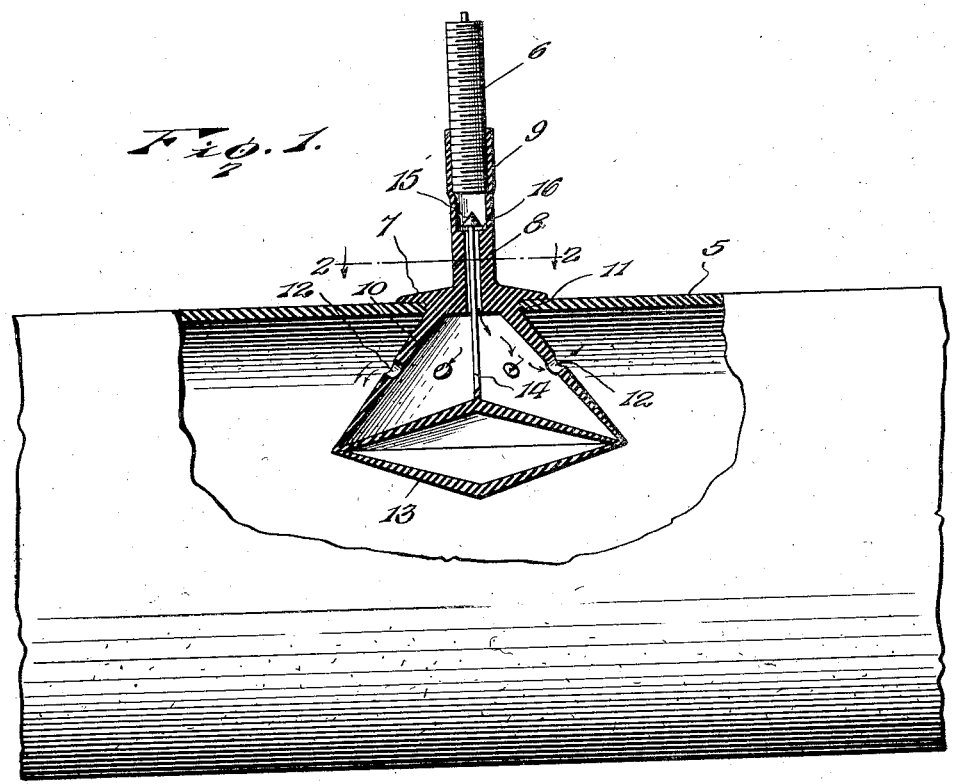
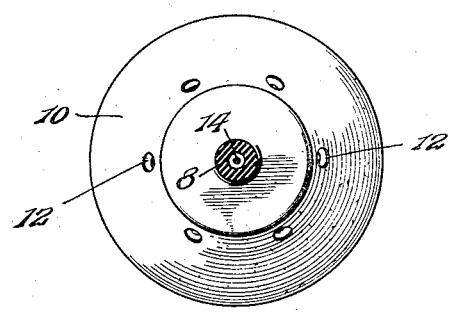
Inventor
Carl D. Ruckman.
By Lacey & Lacey,
Attorneys Patented Dec. 17, 1935

2,024,780

UNITED STATES PATENT OFFICE 2,024,780

FLUID PRESSURE CONTROLLING DEVICE

Carl D. Ruckman, Hobson, Mont.

Application April 23, 1934, Serial No. 722,009

1 Claim. (Cl. 152—11.5)

This invention relates to fluid pressure controlling devices for pneumatic inner tubes and other inflatable bodies and has for its object to provide a comparatively simple and thoroughly efficient device of this character by means of which the inner tube of a pneumatic tire may be inflated to any predetermined pressure and the flow of air thereto automatically cut off when the desired pressure is reached.

A further object of the invention is to provide a pressure controlling device which is permanently secured in position on the inner tube and is actuated by the pressure of air within the tube thereby dispensing with the use of tire gauges and similar auxiliary devices generally employed for this purpose.

A further object is to provide a pressure controlling device including a pressure sack or diaphragm having a valve stem connected therewith and provided with a valve normally held in open position to permit the flow of air into the inner tube, said sack or diaphragm being actuated by the pressure of air within the tube to automatically close the valve and cut off the air intake when the tire has been inflated to the desired pressure.

A still further object of the invention is generally to improve this class of devices so as to increase their utility, durability and efficiency.

Similar numerals of reference indicate corresponding parts in all the figures of the drawing.

Figure 1 is a side elevation, partly in section, of a pressure controlling device constructed in accordance with the present invention and showing the same in position on the inner tube of a pneumatic tire.

Figure 2 is a transverse sectional view taken on the line 2—2 of Figure 1, with the tire omitted.

The improved pressure controlling device, forming the subject-matter of the present invention, is principally designed for use on the inner tubes of pneumatic tires, and by way of illustration is shown secured in position on an inner tube 5 of standard construction at a point opposite the inflation valve 6. The device is preferably formed of rubber and comprises an attaching flange 7 which fits on the outside of the inner tube 5 and is cemented, vulcanized or otherwise rigidly secured thereto, said flange being provided with an upstanding neck 8 terminating in a relatively thin tube or collar 9 which receives and resiliently clamps the inflation valve 6, as shown. Secured to or formed integral with the flange 7 is a substantially conical-shaped protecting skirt 10 which extends through an opening 11 in the inner tube 5 and is provided with one or more openings 12 to permit the escape of air when the tire is being inflated. Disposed at the lower or large end of the skirt 10 and cemented, vulcanized or otherwise permanently secured thereto is a hollow fluid-receiving sack or diaphragm 13 lenticular in cross section, and secured to the upper wall of the sack or diaphragm 13 is a valve stem 14 which projects through the neck 8 and terminates in a valve 15 for engagement with a valve seat 16 preferably disposed at the junction of the neck and tube 9, as best shown in Figure 1 of the drawing. The sack or diaphragm is adapted to be filled with air or other suitable fluid at any desired pressure, the degree of pressure of the air or fluid in the diaphragm and the length of the valve stem 14 governing the degree of pressure of the air in the inner tube. The air, gas or other fluid may be introduced into the sack or diaphragm 13 and the latter then vulcanized or otherwise secured to the lower end of the skirt in any well-known manner.

In operation, the valve 15 is normally open so that when the inflation valve 6 is connected with a pump or other suitable source of air supply, the air will pass downwardly beneath the valve and through the neck 8 into the skirt 10 and thence outwardly through the openings 12 into the inner tube. As the pressure within the inner tube increases, the air will act upon the diaphragm and tend to contract the same, thereby pulling downwardly on the stem 14 and closing the valve 15 so as to cut off the air intake after the air in the tube has reached the desired pressure. As the device projects within the inner tube and the skirt is formed with perforations, the air is permitted to act upon both the upper and lower walls of the sack or diaphragm so that the device is positive in action, and as the body thereof is formed of rubber, liability of cutting or otherwise mutilating the tube is reduced to a minimum. While the device is particularly adapted for use on the inner tubes of pneumatic tires, it will, of course, be understood that it can be used with equally good results on basket-balls, footballs, or any other type of inflatable body, without departing from the spirit of the invention. It will also be understood that the devices may be made in different sizes and shapes according to the kind of inflatable body on which they are used and inasmuch as the degree of pressure desired within the inflatable body is governed by the length of the valve and the pressure of the air within the sack or diaphragm, it follows that the device may be adjusted so as to control the pressure within the inflatable tube or body to a nicety.

Having thus described the invention, I claim:

A pressure controlling device for inflatable bodies comprising an integral structure formed of rubber and including a substantially conical shaped perforated skirt having an upstanding neck provided with a valve seat, a hollow fluid receiving diaphragm integral with the skirt and forming a closure for the bottom thereof, a valve stem arising from the upper surface of the diaphragm at approximately the center thereof, and a valve carried by the valve stem and adapted to engage said seat.

CARL D. RUCKMAN.